July 1, 1952 L. N. PAUL ET AL 2,601,820
VENT PIPE CAP
Filed Dec. 12, 1947

INVENTORS
LAWRENCE N. PAUL
LEONARD E. SICARD
BY
ATTORNEY

Patented July 1, 1952

2,601,820

UNITED STATES PATENT OFFICE 2,601,820

VENT PIPE CAP

Lawrence N. Paul and Leonard E. Sicard, Minneapolis, Minn.

Application December 12, 1947, Serial No. 791,356

3 Claims. (Cl. 98—122)

Our invention relates to an improvement in a vent cap for vent pipes used particularly with relation to storage tanks for oil burners.

It is a feature of our invention to provide a one piece vent cap which adequately caps a vent pipe and which requires simple installation and allows necessary ventilation.

It is a primary feature to provide a vent cap which is dual in nature in that it will fit several sizes of standard vent pipes, the unused recess providing adequate covering and ventilation.

An additional object of our invention lies in providing a vent cap that is easily constructed and retained in place by a single screw.

Our device fills a long felt need under many building codes. The cap is molded in one piece and is composed of two different sized recesses for various sizes of pipe. Either recess may be used, the remaining recess providing an extended ventilating hood. We also provide lugs in the bottom of the recess which contact the end of the vent pipe and prohibit the pipe from contacting the bottom of the recesses to form a ventilation passageway under the hood of the vent cap which extends above the upper edge of the ventilating pipe. The bottom portion of the recess together with the unused pipe receiving recess forms the ventilation passageway from the pipe to which the vent cap is attached.

It is also a feature to provide a vent cap for various sizes of vent pipes wherein a central longitudinal rib extends from the inner wall of the cap and which provides means against which the vent pipe may rest. This central rib, together with complemental inner ribs positioned at various points in the vent cap, forms shoulder means for receiving the outer free end of the vent pipe.

Our vent cap is designed to be used on the ventilating pipe of an oil tank. Such pipes are usually positioned out of doors and it is desirable that they be covered in a manner to prevent dirt from entering the vent pipes. These ventilating pipes are generally in two standard sizes, and our vent cap is designed to fit on the same. However, several different sized pipes will fit within our cap, and the cap may be firmly clamped to the pipe by the adjusting screw means.

In one form of our ventilating cap we provide several pipe recesses with the stop shoulders projecting from the inner top wall of the vent cap, and in this form a single screw serves to tighten the different sized vent pipes in the recess in the cap which is nearest the dimension of the outside diameter of the vent pipe. This provides an extremely simple form of our vent cap.

These features together with other details and objects will be more fully and clearly set forth throughout the specification and claims.

Figure 1:
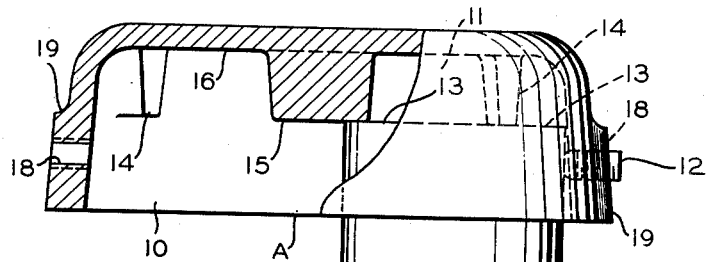
Figure 1 is a side elevational view of our cap in position on a vent pipe partly in longitudinal section.
Figure 2:
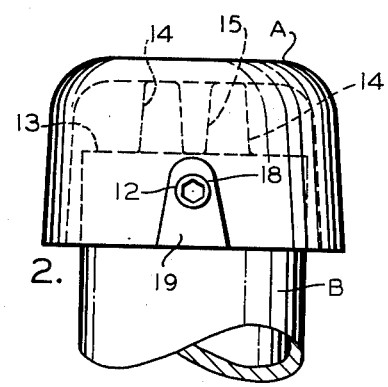
Figure 2 is an end view thereof showing the cap in position on a vent pipe.
Figure 3:
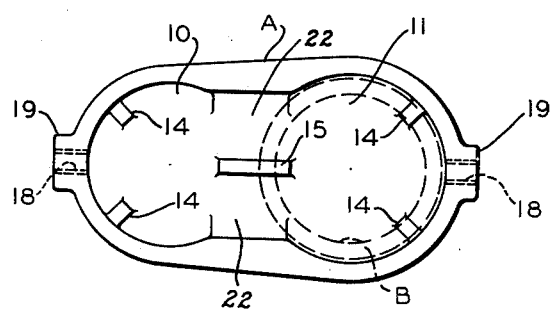
Figure 3 is a view of the underside thereof.

Our ventilator A is designed to form a hood and cap for the end of ventilator pipes B. The ventilator pipes B may be the vent pipes from oil tanks such as are used for oil burners and where it is desirable to have a ventilating pipe extending out into the atmosphere.

A primary feature of our ventilating cap A resides in forming two different sized recesses, namely 10 and 11, which are adapted to receive two or more different sized ventilating pipes. The ventilating pipe B is adapted to be held in position within the recess 11 by the set-screw 12, while the upper edge 13 of the pipe B rests on the inner depending lugs 14 and 15.

The lugs 14 are spaced apart and project radially toward the axis of the recess 11 and also toward the axis of the recess 10. The central lug 15 extends longitudinally within the vent cap A and is in line with the axes of the openings 10 and 11.

The lugs 14 and 15 extend downward from the inner surface 16 to provide means for holding the upper edge 13 of the pipe B or any ventilating pipe such as B, from coming directly in contact with the inner surface of the wall 16. Thus we provide a ventilating passageway from the vent pipe B from the side of the hood in which the pipe B extends (and in which it is supported) to the opposite side such as the recess 10. The pipe B is shown projecting into the recess 11. The passageway 22 is formed in the cap A connecting the recesses 10 and 11.

In the cap A we provide two threaded openings 18 which are adapted to receive the set-screws 12. The set-screw 12 locks the cap A to the upper end of the ventilating pipe B. In the use of our cap A, ordinarily one ventilating pipe such as B is positioned either within the recess 10 or the recess 11, and therefore only one set-screw 12 is required. The action of the set-screw tends to squeeze the pipe B with sufficient force to lock the pipe B rigidly to the ventilating cap A.

The convenience of our double recess ventilating cap resides in permitting one style of cap to be carried by the plumber or oil burner supplier, which cap will serve for several different sized ventilating pipes.

Figure 4:
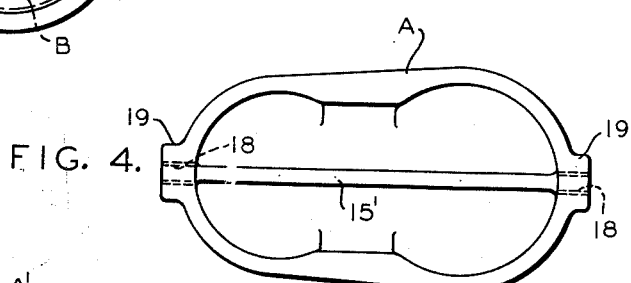
Figure 4 is a view of the underside of an alternative form of our device.

In the form of our cap A illustrated in Figure 4, a central longitudinal rib 15′ projects in the same manner as the lug 15. However, the longitudinal rib 15' extends from one end to the other within the inside of the cap A. This single rib 15' provides the necessary rest for the edge 13 of the ventilating pipe B to hold the cap A squarely on the free end of the pipe B without the aid of the radial short lugs 14.

The ventilating cap A is formed with projecting bosses 19 on either end thereof to provide additional material for the threaded openings 18.

Figure 5:
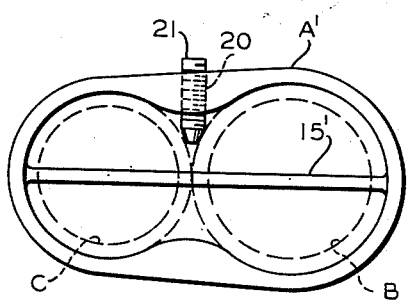
Figure 5 is a plan view of the underside of a further alternative form of our vent cap.

In Figure 5 we have illustrated a simplified form of our ventilating cap A'. This cap is not formed with the end bosses 19 as it does not require these bosses. In this ventilating cap A' we provide a central threaded opening 20 which is adapted to receive the set-screw 21.

In Figure 5 the set-screw 21 is illustrated to show the manner in which the same would engage the outer surface of a ventilating pipe such as B, or a ventilating pipe of a smaller diameter such as C, as shown in dotted outline in Figure 5.

It will be apparent that our ventilating cap A is a simple inexpensive device and that it may be used on various sized ventilating pipes to protect the upper open free end of the ventilating pipe such as B by attaching a cap to the top of the pipe, the set-screw 12 holding the cap in place. (In the form shown in Figure 5, the set-screw 21 will hold the pipe in place.) The cap A' is extremely simple in construction, requiring only a single threaded hole 20 for the set-screw 21. However, this cap will accommodate different sized pipes and may be readily attached to the free end of these ventilating pipes.

In the use of the ventilator caps A and A', the open part under the hood of the cap adjacent the recess which receives the ventilating pipe forms a free ventilating passageway to the opening of the pipe secured in the cap. A further feature resides in providing a cap which extends close to the upper open end of the ventilating pipe and yet which is provided with a free passageway under the cap to the outer atmosphere. In this manner we have provided a very desirable form of cap for ventilating pipes which may be easily and quickly attached thereto, and which has a wider range of use than the ordinary single cap.

Our vent cap can be used close to the wall of a building which is not possible with other types of vent caps.

We claim:

1. A vent cap for ventilating pipes formed of a single piece of material having a pair of adjacent different sized recesses formed in the under side of said cap and a passageway connecting said recesses, stop ribs projecting down from the inner surfaces of said cap adapted to rest against the open end of a vent pipe to limit the positioning of the pipe in one of the recesses to provide an air passageway under said cap leading from and to the vent pipe, and means for clamping the pipe in said cap within either of said recesses, the remaining recess and passageway providing ventilation.

2. A vent cap for various sizes of pipes, including a body portion having various sized pipe receiving recesses formed in said body adjacent each other and having a passageway connecting said recesses of a width less than the diameter of said recesses, rib means formed in the under side of said body portion for positioning the end of a vent pipe apart therefrom and means for securing said cap to a vent pipe.

3. A dual vent cap consisting of a body portion having pipe receiving recesses formed therein and a passageway of a width less than the diameter of said recesses connecting said recesses, ribs formed in the bottom of said recesses and said passageway, means for securing a pipe in either of said recesses whereby the remaining recess and said passageway provide a ventilating hood for a pipe.

LAWRENCE N. PAUL.
LEONARD E. SICARD.

REFERENCES CITED

The following references are of record in the file of this patent:

UNITED STATES PATENTS

| Number | Name | Date |
|---|---|---|
| 445,522 | Dellinger | Jan. 27, 1891 |
| 718,657 | Renton | Jan. 20, 1903 |
| 912,823 | Dehn | Feb. 16, 1909 |
| 1,213,884 | Knowles | Jan. 30, 1917 |
| 1,784,067 | Holtson | Dec. 9, 1930 |
| 1,868,730 | Dowrie | July 26, 1932 |
| 1,887,119 | Cornell, Jr. | Nov. 8, 1932 |
| 2,267,797 | Martin | Dec. 30, 1941 |
| 2,465,533 | Hawes | Mar. 29, 1949 |